United States Patent
Kohno et al.

(10) Patent No.: US 11,590,722 B2
(45) Date of Patent: Feb. 28, 2023

(54) PRESS LOAD MEASURING APPARATUS AND METHOD FOR PRESS MACHINE

(71) Applicant: AIDA ENGINEERING, LTD., Kanagawa (JP)

(72) Inventors: Yasuyuki Kohno, Kanagawa (JP); Kazuki Honjo, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 0 days.

(21) Appl. No.: 16/716,212

(22) Filed: Dec. 16, 2019

(65) Prior Publication Data

US 2020/0307138 A1 Oct. 1, 2020

(30) Foreign Application Priority Data

Mar. 26, 2019 (JP) ............................ JP2019-058077

(51) Int. Cl.
*B30B 15/00* (2006.01)
*G01L 5/00* (2006.01)

(52) U.S. Cl.
CPC ........ *B30B 15/0094* (2013.01); *G01L 5/0076* (2013.01)

(58) Field of Classification Search
CPC .... B30B 15/0094; B30B 15/26; G01L 5/0076
See application file for complete search history.

(56) References Cited

U.S. PATENT DOCUMENTS

| 4,116,050 A | * | 9/1978 | Tanahashi | B30B 15/0094 100/99 |
| 4,453,421 A | * | 6/1984 | Umano | B30B 15/0094 100/99 |
| 5,450,756 A | * | 9/1995 | Kirii | B30B 1/265 73/825 |

FOREIGN PATENT DOCUMENTS

| JP | 6-55300 A | | 3/1994 |
| JP | 6-143000 A | | 5/1994 |
| KR | 20110112508 A | * | 10/2011 |
| KR | 20110112508 A | * | 10/2011 |

* cited by examiner

*Primary Examiner* — Shelley M Self
*Assistant Examiner* — P Derek Pressley
(74) *Attorney, Agent, or Firm* — McDermott Will & Emery LLP

(57) ABSTRACT

A press load measuring apparatus includes: strain gauges attached to respective columns of a press machine and configured to detect strains generated in the respective columns respectively in association with a press load acting on a slide of the press machine, an inertial force calculator configured to calculate a slide inertial force proportional to a product of a mass of a slide and a member connected to the slide and a slide acceleration detected by an acceleration detector, and a press load calculator configured to calculate press partial load signals before calibration based on a strain signals detected by the strain gauges, eliminate a slide inertial force signals from the press partial load signals before the calibration, and calculate calibrated press partial load signals.

4 Claims, 9 Drawing Sheets

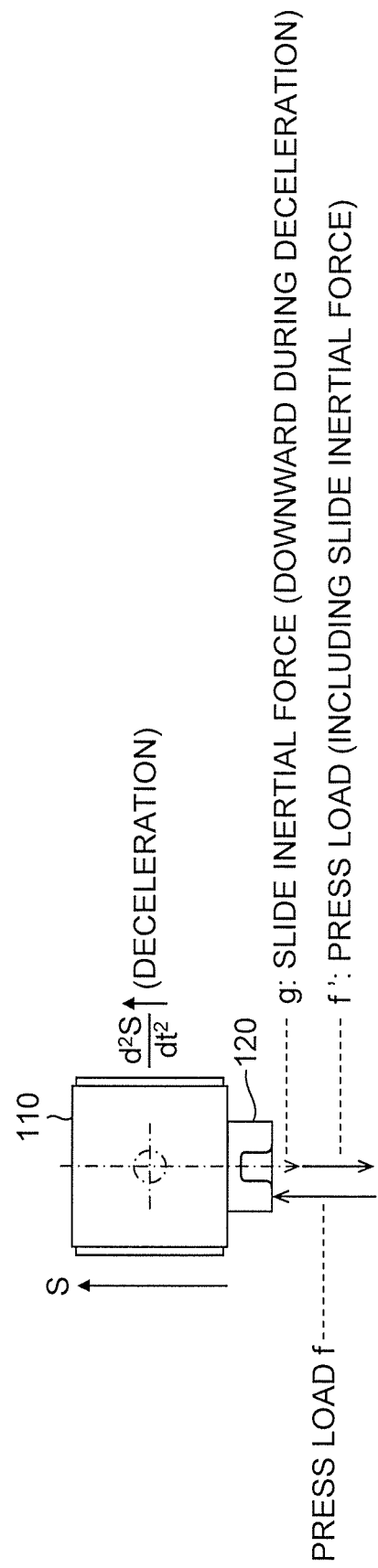

PRESS LOAD MEASURING APPARATUS AND METHOD FOR PRESS MACHINE

CROSS-REFERENCE TO RELATED APPLICATIONS

The present application claims priority under 35 U.S.C. § 119 to Japanese Patent Application No. 2019-058077 filed on Mar. 26, 2019. The above application is hereby expressly incorporated by reference, in its entirety, into the present application.

BACKGROUND OF THE INVENTION

Field of the Invention

The present invention relates to a press load measuring apparatus and method for a press machine, and more particularly to a technique for measuring a press load by a strain generated in a frame of a press machine.

Description of the Related Art

In related art, there has been proposed a technique in which strain gauges are attached respectively to a plurality of columns constituting a frame of a press machine, and a press load is measured from strains of the respective columns detected by the respective strain gauges (Japanese Patent Application Laid-Open No. H06-55300, Japanese Patent Application Laid-Open No. H06-143000).

In a method of measuring a press load described in Japanese Patent Application Laid-Open No. H06-55300, the press load is derived from the sum of the resistance values of the strain gauges provided for the respective columns in a pressing device having the plurality of columns.

The load measuring apparatus of the press machine described in Japanese Patent Application Laid-Open No. H06-143000 includes a storage device which stores in advance a relationship between an actual press load and a detected value by a strain sensor (strain gauge), and obtains a corresponding press load from the correspondence relationship stored in the storage device based on the detected value of the strain sensor at the time of actual press working.

CITATION LIST

Patent Literature 1: Japanese Patent Application Laid-Open No. H06-55300
Patent Literature 2: Japanese Patent Application Laid-Open No. H06-143000

SUMMARY OF THE INVENTION

The present inventors have found that a slide load measured by a method of measuring a press load of this type has an impact of a slide inertial force during acceleration and deceleration of the slide and thus is measured as a press load which is larger than or smaller than the actual press load.

FIG. 11 is a waveform diagram of a press load signal F' showing a press load (kN) measured by a method of measuring a press load of the related art, and particularly for a case where a large-sized press machine having a large maximum pressure capacity.

As shown in FIG. 11, when the slide moves from the top dead center to the bottom dead center, in the vicinity of 0.45 seconds and in the vicinity of 0.9 seconds after having passed the middle of a stroke and before molding, measurement of the press load signal F' is such that a positive press load value is measured in the vicinity of the 0.45 seconds and a negative press load value is measured in the vicinity of 0.9 seconds irrespective of a no-load state (the state in which no press load acts).

Here, in the vicinity of 0.45 seconds, the slide is accelerating from the top dead center to the bottom dead center, and in the vicinity of 0.9 seconds, the slide is decelerating before the molding. In other words, the press load signal F' to be measured is impacted by the slide inertial force in association with acceleration and deceleration of the slide.

Due to the impact of the slide inertial force, press load values other than zero are generated in steps other than a molding process, and press load values smaller than that in the actual case are generated in the vicinity of the bottom dead center during the molding process.

In the press load measuring method and apparatus described in Japanese Patent Application Laid-Open No. H06-55300, Japanese Patent Application Laid-Open No. H06-143000, an inaccurate press load including the slide inertial force is measured during the acceleration and deceleration of the slide in response to the impact (error) of the slide inertial force in association with the acceleration and deceleration of the slide. This confused users who tried to inspect the causal relationship between the press load and the result of molding.

In addition, in recent years, press machines are advanced by employing a servo system or by using Internet such as IOT (Internet of Things) to achieve easy communication of a state quantity of the press machine as digital information, and, on the other hand, the press machines are not evolved in terms of measurement of the basic (physical) press load (the accuracy is not improved).

In view of such circumstances, it is an object of the invention to provide a press load measuring apparatus and method for a press machine capable of accurately measuring a press load of the press machine or press partial loads shared by respective columns of the press machine even during acceleration and deceleration of a slide.

In order to achieve the object described above, a press load measuring apparatus for a press machine according to one aspect of the invention includes: a plurality of strain gauges attached to a plurality of columns of the press machine respectively, the plurality of strain gauges detecting respective strains generated in the plurality of columns in association with a press load acting on a slide of the press machine; an inertial force calculator configured to calculate a slide inertial force proportional to a product of a mass of the slide and a member connected to the slide and an acceleration of the slide; and a press load calculator configured to calculate press loads before calibration based on strains detected by the strain gauges attached to the respective columns of the plurality of columns, eliminate the calculated slide inertial force from the press loads before the calibration, and calculate calibrated press loads.

In the case of a large-sized press machine having a large mass of the slide or a mold, the slide inertial force caused by an acceleration of the slide impacts the accuracy of the press load to be measured.

According to an aspect of the invention, the slide inertial force proportional to a product of a mass of the slide and a member connected to the slide and an acceleration of the slide is calculated. The press load before the calibration is calibrated by eliminating calculated the slide inertial force from the press load before the calibration calculated based on the strains detected by the strain gauges attached to the respective columns of the plurality of columns, thereby enabling measurement of the press load with high degree of accuracy even during the acceleration and deceleration of the slide.

In a press load measuring apparatus for a press machine according to a further aspect of the invention, it is preferable that the press load measuring apparatus further includes an output section configured to output the calibrated press loads. Accordingly, the user can confirm a correct press load calibrated based on an output result from the output section.

A press load measuring apparatus for a press machine according to a further aspect of the invention includes: a plurality of strain gauges attached to a plurality of columns of the press machine respectively, the plurality of strain gauges detecting respective strains generated in the plurality of columns in association with a press load acting on a slide of the press machine; an inertial force calculator configured to calculate a slide inertial force proportional to a product of a mass of the slide and a member connected to the slide and an acceleration of the slide; and a press partial load calculator configured to respectively calculate press partial loads before calibration corresponding to the respective columns of the plurality of columns based on the strains detected by the strain gauges attached to the respective columns of the plurality of columns, eliminate the slide inertial force acting on the respective columns out of the calculated slide inertial force from the press partial loads before the calibration, and calculates calibrated press partial loads, respectively.

According to still another aspect of the invention, the press partial loads shared by the respective columns of the press machine can be accurately measured even during the acceleration and deceleration of the slide.

In a press load measuring apparatus for a press machine according to a further aspect of the invention, it is preferable that the press load measuring apparatus further includes an adder configured to calculate a sum of the calibrated press partial loads as a press load. This makes it possible to measure a press load with high degree of accuracy without being impacted by the slide inertial force generated by the slide or the like even during the acceleration and deceleration of the slide.

In the press load measuring apparatus for a press machine according to still another aspect of the invention, it is preferable that the press load measuring apparatus further includes an output section configured to output the calibrated press partial loads respectively or to output the sum of the calibrated press partial loads as a press load.

In the press load measuring apparatus for a press machine according to still another aspect of the invention, the member connected to the slide includes an upper mold to be mounted on the slide.

In the press load measuring apparatus for a press machine according to still another aspect of the invention, the press load measuring apparatus further includes an acceleration detector configured to detect the acceleration of the slide, and the inertial force calculator calculates the slide inertial force G by using the following expression $G=-M\cdot\alpha$, where M is the mass and $\alpha$ is the acceleration in an upward direction to be detected.

In the press load measuring apparatus for a press machine according to still another aspect of the invention, assuming that N is the number of the plurality of columns, i is a number indicating any one of 1 to N, $\varepsilon_{Ti}$ is a strain signal indicating the strains detected respectively by the strain gauges mounted on the respective columns, and $K_{\varepsilon F}$ is a proportionality constant to reach and load value to the strain signal $\varepsilon_{Ti}$, the press partial load calculator calculates the press partial load $F_i'$ before the calibration by using the following expression, $$F_i'=K_{\varepsilon F}\cdot\varepsilon_{Ti},$$

and assuming that G/N is a slide inertial force acting on the respective columns out of the slide inertial force, the press partial load calculator calculates the calibrated press partial load $F_i$ by using the following expression, $$F_i=F_i'-G/N.$$

In other words, the impact of the slide inertial force of the slide or the like on the calibrated press partial loads $F_i$ shared by the respective column is eliminated by subtracting the slide inertial force G/N acting on the respective columns from the calibrated press partial loads $F_i'$ before the calibration.

A press load measuring method for a press machine according to a further aspect of the invention includes: attaching a plurality of strain gauges respectively to a plurality of columns of the press machine, the strain gauges detecting strains generated in the respective columns in association with a press load acting on a slide of the press machine; calculating an slide inertial force proportional to a product of a mass of the slide and a member connected to the slide and an acceleration of the slide by a slide inertial force calculator; and calculating press partial loads before the calibration corresponding to the respective columns of the plurality of columns based on the strains detected by the strain gauges attached to the respective columns of the plurality of columns by a press load calculator, and eliminating the calculated slide inertial force from the press partial loads before the calibration, and calculating the calibrated press load.

A press load measuring method for a press machine according to a further aspect of the invention includes: attaching strain gauges respectively to a plurality of columns of the press machine, the strain gauges detecting strains generated in the respective columns in association with a press load acting on a slide of the press machine; calculating an slide inertial force proportional to a product of a mass of the slide and a member connected to the slide and an acceleration of the slide by a slide inertial force calculator; and calculating press partial loads before the calibration corresponding to the respective columns of the plurality of columns based on the strains detected by the strain gauges attached to the respective columns of the plurality of columns by a press partial load calculator, eliminating slide inertial forces acting on the respective columns out of the calculated slide inertial force from the press partial loads before the calibration, and calculating the calibrated press partial loads, respectively.

In the press load measuring method for a press machine according to still another aspect of the invention, it is preferable that the adder calculates the sum of the calibrated press partial loads as a press load.

In the press load measuring method for a press machine according to still another aspect of the invention, it is preferable that an acceleration detector detects an acceleration of the slide, and the slide inertial force calculator calculates the slide inertial force G by using the following expression $$G=-M\cdot\alpha,$$

where M is the mass and $\alpha$ is the acceleration in the upward direction to be detected.

In the press load measuring method for a press machine according to still another aspect of the invention, it is preferable that, assuming that N is the number of the plurality of columns, i is a number indicating any one of 1 to N, $\varepsilon_{Ti}$ is a strain signal indicating strains detected respectively by the strain gauges mounted on the respective columns, and $K_{\varepsilon F}$ is a proportionality constant to reach the load value for the strain signal cm the press partial load calculator calculates the press partial load $F_i'$ before the calibration by using the following expression, $$F_i' = K_{\varepsilon F} \cdot \varepsilon_{Ti},$$

and assuming that G/N is a slide inertial force acting on the respective columns out of the calculated slide inertial force, the press partial load calculator calculates the calibrated press partial load $F_i$ by using the following expression, $$F_i = F_i' - G/N.$$

According to the invention, since the impact (error) of the slide inertial force of the slide in association with the acceleration and deceleration of the slide is eliminated, the press load of the press machine or the press partial loads shared by the respective columns of the press machine can be accurately measured even during the acceleration and deceleration of the slide.

BRIEF DESCRIPTION OF THE DRAWINGS

FIG. 3 is a drawing used to explain a relationship between the press load acting on the slide and the slide inertial force;

DETAILED DESCRIPTION OF THE PREFERRED EMBODIMENTS

Preferred embodiments of a press load measuring apparatus and method for a press machine according to the invention will now be described in detail with reference to the accompanying drawings.

Figure 1:
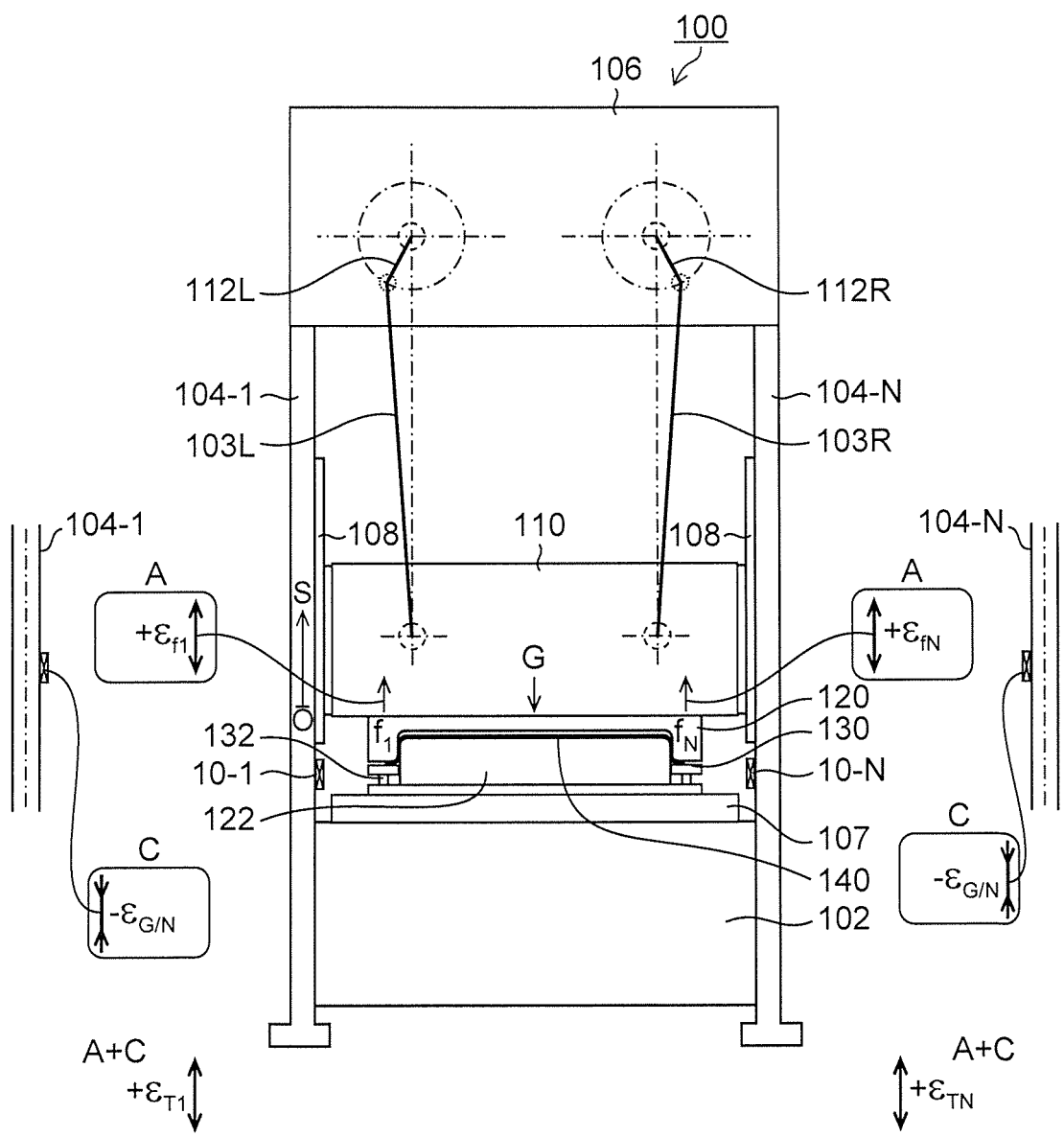
FIG. 1 illustrates an embodiment of a press machine to which a press load measuring apparatus for a press machine according to the invention is applied.

FIG. 1 illustrates an embodiment of a press machine to which a press load measuring apparatus for a press machine according to the invention is applied.

The press machine 100 illustrated in FIG. 1 has a frame structure formed by a bed 102, N columns 104-1 and 104-2 . . . 104-N, and a crown 106, which is in front, rear, left, and right symmetry with respect to a center of the machine.

In this example, 4 columns (N=4) of columns 104-1 to 104-4 are provided as N columns, and the columns 104-1 to 104-4 are columns on the left front, right front, left rear, and right rear, respectively.

A slide 110 is guided by guide portions 108 provided on the columns 104-1 to 104-4 so as to be movable in the vertical direction (perpendicular direction).

The press machine 100 is a large-sized press machine of 2-point type configured to drive the slide 110 by left and right crank mechanisms having two crank shafts 112L and 112R and two connecting rods 103L and 103R, and has a maximum pressure capacity of 25000 [kN], and a slide stroke of 1100 [mm].

A rotational driving force is transmitted from a servo motor, not illustrated, to the crank shafts 112L and 112R of the left and right crank mechanisms via a speed reducer so as to rotate reversely to each other, and the slide 110 is moved in the vertical direction in FIG. 1 by the rotation of the left and right crank shafts 112L and 112R in the opposite directions.

Strain gauges 10-1, 10-2, . . . 10-N are attached to front, rear, left and right four columns 104-1 to 104-4 on inner surfaces of the respective columns 104-1 to 104-4, respectively. In this example, four strain gauges 10-1 to 10-4 are attached to the respective columns 104-1 to 104-4 in correspondence to the four columns 104-1 to 104-4.

An upper mold 120 is mounted on the slide 110, and a lower mold 122 is mounted on a bolster 107 on the bed 102.

A blank holder (a wrinkle retaining plate) 130 is disposed between the upper mold 120 and the lower mold 122, a lower side thereof is supported by a cushion pad (not illustrated) via a plurality of cushion pins 132, and a blank material (a material) 140 is set on an upper side of the blank holder 130.

[Principle of Press Load Measurement]

Next, the principle of the press load measurement applied to the invention will be described.

First, parameters, signals, and constants used for a press load measurement will be defined as follows.

$f_1$: press partial load shared by the column 104-1 [kN]
$f_N$: press partial load N shared by the column 104-N [kN]
f: total press load [kN]
$F_1'$: press partial load signal including the slide inertial force detected by the strain gauge 10-1
$F_N'$: press partial load signal including the slide inertial force detected by the strain gauge 10-N
F': press total load signal including the slide inertial force [kN]

$F_1$: press partial load signal not including the slide inertial force $F_N$: press partial load signal not including the slide inertial force F: press total load signal not including the slide inertial force [kN]

G: slide inertial force signal [kN]

S: slide position signal [mm]

M: mass of the member connected to the slide and the slide [kg]

$\varepsilon_{F1}$: strain signal proportional to $F_1$ $\varepsilon_{FN}$: strain signal proportional to $F_N$ $\varepsilon_G$: strain signal proportional to G $\varepsilon_{T1}$: strain signal detected by a strain gauge 10-1

$\varepsilon_{TN}$: strain signal detected by a strain gauge 10-N

$K_{\varepsilon F}$: proportionality constant (load/strain calibration value at the bottom dead center in a rest state)

The strain gauges 10-1 to 10-4 detect strains generated in the columns 104-1 to 104-4, respectively, in association with a press load acting on the slide 110.

A relation between strains (strain signals indicating the strains) detected by the strain gauges 10-1 to 10-4 and a press load is calibrated by the following manner. In an adjustment phase of the press machine 100, a center portion of the slide is pressed with an upward force having clear value by a hydraulic jack placed on the bolster 107 while the slide 110 is stationary at the bottom dead center. Regarding this force of the hydraulic jack, each of the strain signals detected by the strain gauges 10-1 to 10-4 (via the respective strain amplifiers) is calibrated so as to bear even component of the force.

Here, assuming that $K_{\varepsilon F}$ (kN) is a proportionality constant reaching load values for the respective strain signals of the strain gauges 10-1 to 10-4 after the calibration, $\varepsilon_{T1}$ to $\varepsilon_{T4}$ are strain signals detected by the strain gauges 10-1 to 10-4, and $F_1'$ to $F_4'$ (kN) are the press partial load signals, the press partial load signals $F_1'$ to $F_4'$ indicating the press load shared by the respective columns 104-1 to 104-4 of the related art (hereinafter, referred to as "press partial loads") are expressed generally as [Expression 1] to [Expression 4].

$$F_1' = K_{\varepsilon F} \cdot \varepsilon_{T1} \quad \text{[Expression 1]}$$

$$F_2' = K_{\varepsilon F} \cdot \varepsilon_{T2} \quad \text{[Expression 2]}$$

$$F_3' = K_{\varepsilon F} \cdot \varepsilon_{T3} \quad \text{[Expression 3]}$$

$$F_4' = K_{\varepsilon F} \cdot \varepsilon_{T4} \quad \text{[Expression 4]}$$

Alternatively, when the strain signal and the press partial load signal are not directly proportional to each other in all load regions, for example, in a calibration phase, $K_{\varepsilon F}$ is calculated as a variable value for each load region.

Figure 2A:
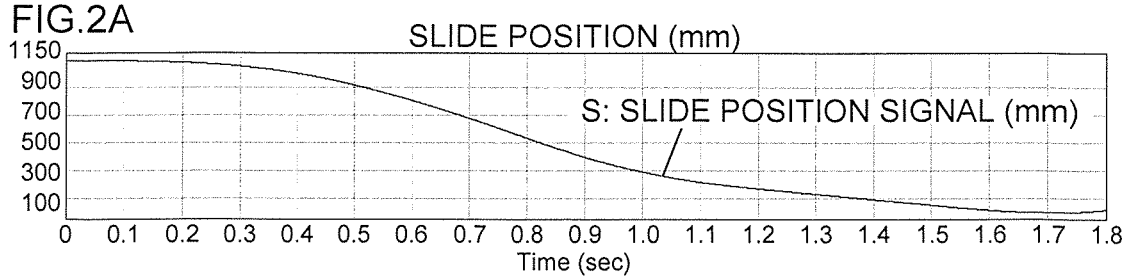
FIG. 2A is a waveform diagram showing a slide position signal S when a side panel for a motor vehicle is molded by using the press machine illustrated in FIG. 1.
Figure 2B:
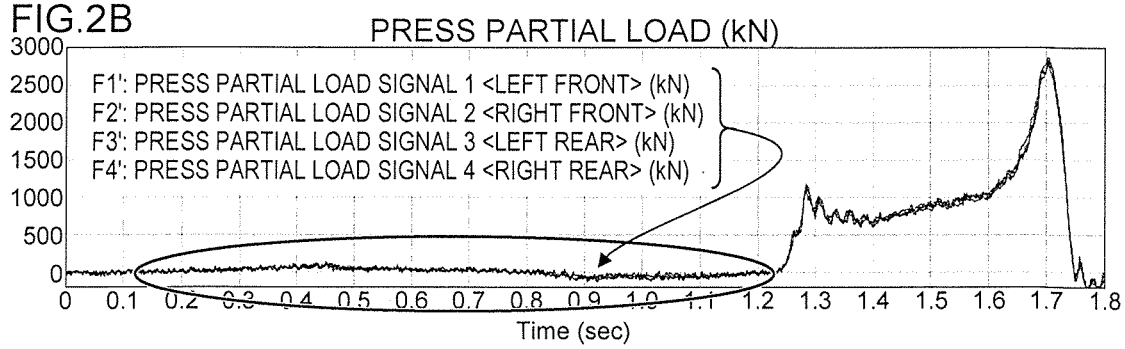
FIG. 2B is a waveform diagram showing press partial load signals $F_1'$ to $F_4'$ corresponding to respective columns, which are measured based on strain signals from respective strain gauges.

The slide position signal S generated when the side panel for an automatic vehicle is molded by using the press machine 100 of this example is illustrated in FIG. 2A, and the press partial load signals $F_1'$ to $F_4'$ corresponding to the respective columns 104-1 to 104-4, which are measured based on the strain signals $\varepsilon_{T1}$ to $\varepsilon_{T4}$ from the respective strain gauges 10-1 to 10-4, are shown in FIG. 2B.

Figure 2C:
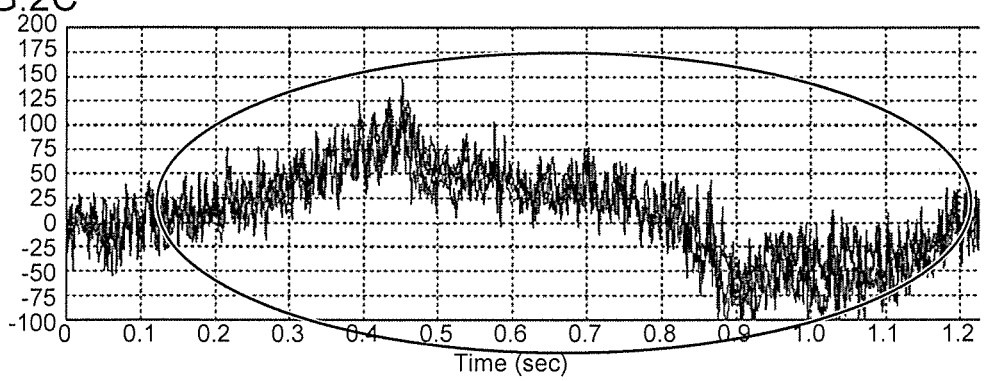
FIG. 2C is an enlarged view of a portion of the respective press partial load signals $F_1'$ to $F_4'$ shown in FIG. 2B.

FIG. 2C is an enlarged view of portions of the press partial load signals $F_1'$ to $F_4'$ shown in FIG. 2B (press partial load signals indicated by an ellipse—no load region).

Note that the four press partial load signals $F_1'$ to $F_4'$ shown in FIG. 2B and FIG. 2C are substantially superimposed on each other in such a manner that they cannot be clearly distinguished from each other in the drawings.

In FIG. 2A, when the slide moves from the top dead center to the bottom dead center, in the vicinity of 0.45 seconds during acceleration and in the vicinity of 0.9 seconds during deceleration after having passed the middle of a stroke and before molding, measurements of the press partial load signals $F_1'$ to $F_4'$ shows approximately ±75 kN irrespective of the fact that the respective press load signals $F_1'$ to $F_4'$ are in a no-load state (the state in which no press load acts) as shown in FIG. 2C.

It is considered that the respective press partial load signals $F_1'$ to $F_4'$ generated in a state where the press loads are not applied are slide inertial forces in association with the acceleration and deceleration of the slide.

[Impact of Slide Inertial Force]

When the slide of the press machine is accelerated or decelerated, due to an impact of a slide inertial force, the correct press partial load signals cannot be measured, especially, and in the case of a large press machine having a large mass of the slide or the like, the impact of the slide inertial force of the slide appears remarkably.

Assuming that M (kg) is a mass of the member such as the slide 110 and the upper mold 120 connected to the slide 110, $\alpha$ ($=d^2S/dt^2$) is an increasing acceleration of the slide 110, and defining that the value of the product of the mass M and the slide acceleration $\alpha$ with a reversed sign is a inertial force signal of the slide or the like (slide inertial force signal) G (kN), the slide inertial force signal G can be expressed by using the following expression.

$$G = -M \cdot \alpha \cdot 10^{-6} = -M \cdot (d^2S/dt^2) \cdot 10^{-6} \quad \text{[Expression 5]}$$

Here, the slide acceleration signal ($d^2S/dt^2$) can be obtained by differentiating the slide speed signal calculated from the crank shaft angular velocity signal obtained by differentiating the crank shaft angle signal from an encoder (not illustrated) provided on the crank shaft 112L or 112R of the press machine 100 by time.

Figure 2D:
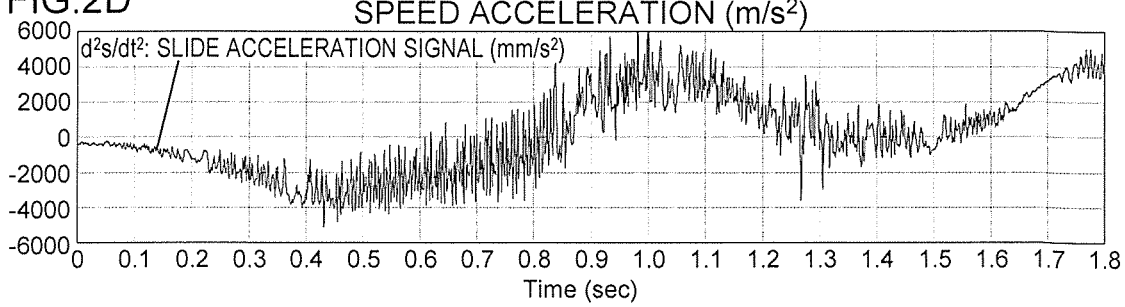
FIG. 2D is a waveform diagram showing a slide acceleration signal ($d^2S/dt^2$)

FIG. 2D is a waveform diagram showing a slide acceleration signal ($d^2S/dt^2$).

The mass M (kg), such as the slide 110 of the press machine 100, is approximately 90000 [kg].

Figure 2E:
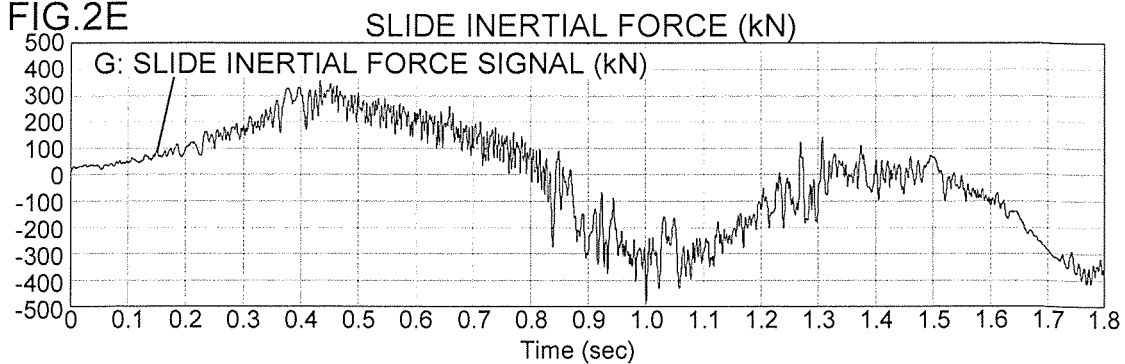
FIG. 2E is a waveform diagram showing a slide inertial force signal G corresponding to the slide acceleration signal ($d^2S/dt^2$)

The slide inertial force signal G calculated by [Expression 5] based on the mass M and the slide acceleration signal ($d^2S/dt^2$) shown in FIG. 2D is shown in FIG. 2E.

The press partial load signals $F_1'$ to $F_4'$ (approximately ±75 kN) in the no-load region shown in FIG. 2C is approximately equal to ¼ of the slide inertial force signal G (approximately ±300 kN).

This is considered to be because the slide inertial force G is included (shared) in each of the press partial load signals. The slide inertial force G is considered to act in accordance with the slide acceleration and deceleration actions during one press cycle, and (in a region where a large press load is applied) before a region the vicinity of the slide bottom dead center, the slide inertial force G shows approximately—400 kN in association with a slide deceleration (FIG. 2E).

FIG. 3 is a drawing used to explain a relationship between the press load acting on the slide 110 and the slide inertial force.

In FIG. 3, assuming that f(kN) is the correct press load, $f_i$ to $f_4$ (kN) are the correct press partial loads, and g (kN) is the slide inertial force, and on the other hand, assuming that the press load signal $f_1'$ to $f_4'$ (kN) including the slide inertial force g and f (kN) is the press load signal including the slide inertial force g, the press partial load signals $f_1'$ to $f_4'$ are press load signals corresponding to the respective columns 104-1 to 104-4 containing respectively the slide inertial force g.

In other words, in the press machine, a part of the press load is borne by the slide inertial force g, and the balance is borne by the driving force (the force of driving the slide from the flywheel in the case of the mechanical type or from the servo motor in the case of the servo type via the speed reducer or the crank mechanism) f ($=f_1'+f_2'+f_3'+f_4'=f-g$)) of the slide. That is, f is smaller than f by a smaller amount than g.

In a large press machine, in the case of the large-sized press machine where the mass M of a slide is large (90000 kg≈100 t), the slide inertial force g cannot be ignored (should not be ignored).

In the past, in a series of tries of the press machine 100, the user has performed two molding processes of a slide speed of 200 mm/sec and a speed of 400 mm/sec in a molding process (a region of the slide position of about 153 mm or less) to obtain a causal relationship between the result of molding and the slide speed.

Then, it is noted in the specification that the press (total) load at the bottom dead center is reduced by about 300 kN when the molding is performed at 400 mm/sec (when the slide speed is increased) compared with the case where the molding is performed at 200 mm/sec. (The user's decision was found to have been confused with the slide inertial force.)

As shown in FIG. 3, the slide inertial force g associated with the slide deceleration serves as part of the molding load. The higher the slide speed during molding, the greater the deceleration degree (slide acceleration) in the vicinity of the bottom dead center (the front side), the larger the slide inertial force g, the smaller the resultant force acting on the slide 110, and the smaller the output of the press load signal f.

In the invention, a correct press load and a correct press partial load are measured by eliminating the impact of the slide inertial force.

Assuming that F is the correct press load signal corresponding to the correct press load f and the correct press partial loads $f_1$ to $f_4$, $F_1$ to $F_4$ are the correct press partial load signals, $\varepsilon_{F1}$ to $\varepsilon_{F4}$ are the strain signals corresponding to the correct press partial load signals $F_1$ to $F_4$, and $\varepsilon_G$ is the strain signal corresponding to the slide inertial force g, the strain signals $\varepsilon_{T1}$ to $\varepsilon_{T4}$ detected from the strain gauges 10-1 to 10-4 can be expressed by [Expression 6] to [Expression 9].

$$\varepsilon_{T1}=\varepsilon_{F1}+\varepsilon_G/4 \quad \text{[Expression 6]}$$

$$\varepsilon_{T2}=\varepsilon_{F2}+\varepsilon_G/4 \quad \text{[Expression 7]}$$

$$\varepsilon_{T3}=\varepsilon_{F3}+\varepsilon_G/4 \quad \text{[Expression 8]}$$

$$\varepsilon_{T4}=\varepsilon_{F4}+\varepsilon_G/4 \quad \text{[Expression 9]}$$

Originally, the press partial load signals $F_1$ to $F_4$ can be expressed by the following [Expression 10] to [Expression 13].

$$F_1=K_{\varepsilon F}\cdot\varepsilon_{F1} \quad \text{[Expression 10]}$$

$$F_2=K_{\varepsilon F}\cdot\varepsilon_{F2} \quad \text{[Expression 11]}$$

$$F_3=K_{\varepsilon F}\cdot\varepsilon_{F3} \quad \text{[Expression 12]}$$

$$F_4=K_{\varepsilon F}\cdot\varepsilon_{F4} \quad \text{[Expression 13]}$$

Then, [Expression 14] to [Expression 17] are obtained from [Expression 6] to [Expression 9], and [Expression 10] to [Expression 13].

$$F_1=K_{\varepsilon F}\cdot(\varepsilon_{T1}-\varepsilon_G/4) \quad \text{[Expression 14]}$$

$$F_2=K_{\varepsilon F}\cdot(\varepsilon_{T2}-\varepsilon_G/4) \quad \text{[Expression 15]}$$

$$F_3=K_{\varepsilon F}\cdot(\varepsilon_{T3}-\varepsilon_G/4) \quad \text{[Expression 16]}$$

$$F_4=K_{\varepsilon F}\cdot(\varepsilon_{T4}-\varepsilon_G/4) \quad \text{[Expression 17]}$$

Since the term ($K_{\varepsilon F}\cdot\varepsilon_G/4$) of the slide inertial force in [Expression 14] to [Expression 17] corresponds to ¼ of the slide inertial force signal G in [Expression 5], [Expression 14] to [Expression 17] can be rewritten to [Expression 18] to [Expression 21].

$$F_1=K_{\varepsilon F}\cdot\varepsilon_{T1}-G/4 \quad \text{[Expression 18]}$$

$$F_2=K_{\varepsilon F}\cdot\varepsilon_{T2}-G/4 \quad \text{[Expression 19]}$$

$$F_3=K_{\varepsilon F}\cdot\varepsilon_{T3}-G/4 \quad \text{[Expression 20]}$$

$$F_4=K_{\varepsilon F}\cdot\varepsilon_{T4}-G/4 \quad \text{[Expression 21]}$$

Since the terms ($K_{\varepsilon F}\cdot\varepsilon_{T1}$ to $K_{\varepsilon F}\cdot\varepsilon_{T4}$) in [Expression 18] to [Expression 21] correspond to $F_1'$ to $F_4'$ in [Expression 1] to [Expression 4], the correct press partial load signals $F_1$ to $F_4$ can be expressed by [Expression 22] to [Expression 25].

$$F_1=F_1'-G/4 \quad \text{[Expression 22]}$$

$$F_2=F_2'-G/4 \quad \text{[Expression 23]}$$

$$F_3=F_3'-G/4 \quad \text{[Expression 24]}$$

$$F_4=F_4'-G/4 \quad \text{[Expression 25]}$$

In other words, assuming that N is the number of the plurality of columns, i is a number indicating any one of 1 to N, $\varepsilon_{Ti}$ is a strain signal indicating the strain detected respectively by the strain gauges 10-1 to 10-N mounted on the respective columns 104-1 to 104-N, and $K_{\varepsilon F}$ is a proportionality constant to reach the load value for the strain signal $\varepsilon_{Ti}$, the press partial load signal $F_i'$ can be expressed by using the following expression, $$F_i'=K_{\varepsilon F}\cdot\varepsilon_{Ti} \quad \text{[Expression 26]}$$

Note that [Expression 26] is an expression corresponding to [Expression 1] to [Expression 4], and $F_i'$ is a press partial load signal of an arbitrary column out of the N columns (slide partial load signal before the calibration under the impact of the slide inertial force).

Assuming that the strain gauges 10-1 to 10-N corresponding to the N columns 104-1 to 104-N shares the slide inertial force signal G evenly, the calibrated correct press partial load signal $F_i$ obtained by eliminating the slide inertial force (G/N) acting on the respective columns can be expressed by using the following expression.

$$F_i=F_i'-G/N \quad \text{[Expression 27]}$$

Note that [Expression 27] is an expression corresponding to [Expression 22] to [Expression 25], and $F_i$ is a press partial load signal after the calibration of an arbitrary column of the N columns.

[Press Load Measuring Apparatus of Press Machine of First Embodiment]

Figure 4:
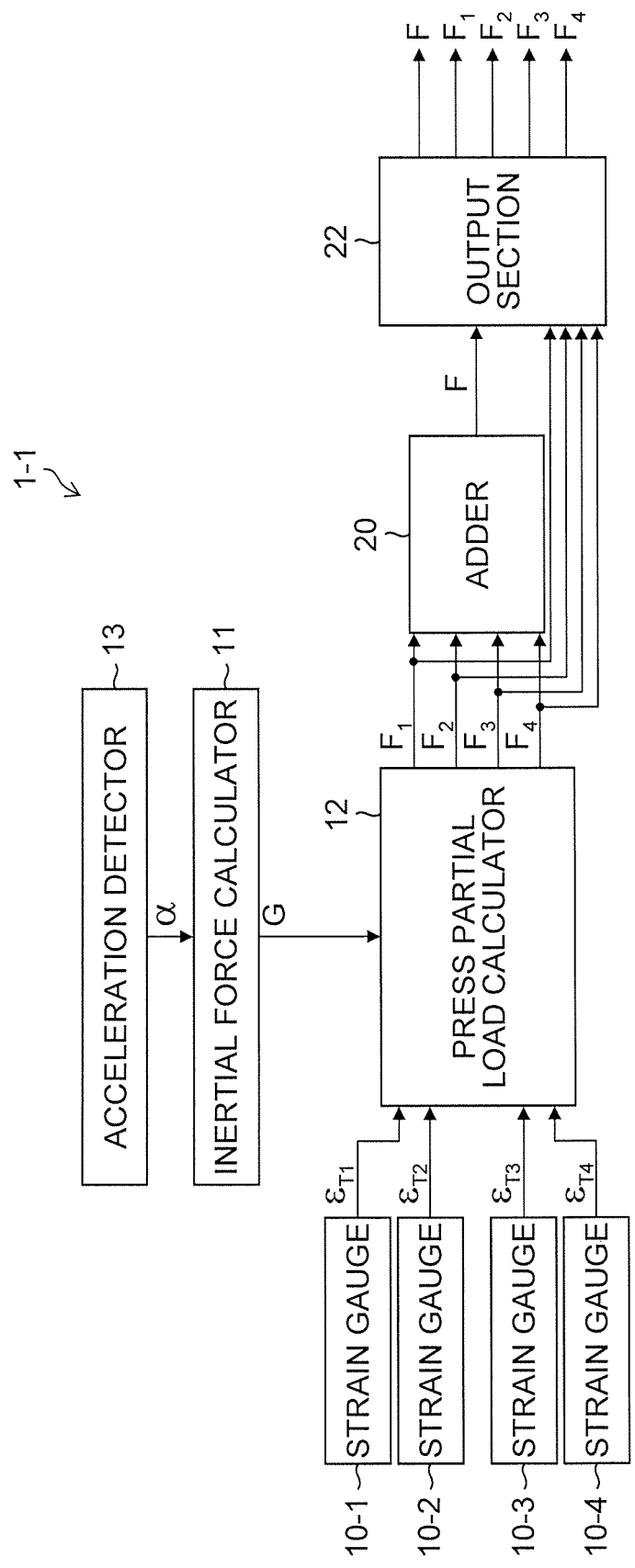
FIG. 4 is a block diagram illustrating a first embodiment of the press load measuring apparatus of a press machine.

FIG. 4 is a block diagram illustrating the first embodiment of the press load measuring apparatus of a press machine.

A press load measuring apparatus 1-1 of the press machine of the first embodiment illustrated in FIG. 4 is configured to eliminate the impact of the strain components corresponding to the slide inertial force included in the strains (strain signals) detected by the respective strain gauges attached to the respective columns, to accurately measure the press partial loads corresponding to the respective columns, and to mainly include the strain gauges 10-1 to 10-4, an inertial force calculator 11, a press partial load calculator 12, an acceleration detector 13, an adder 20, and an output section 22.

The strain gauges 10-1 to 10-4 are attached to the front, rear, left and right four columns 104-1 to 104-4, and outputs strain signals $\varepsilon_{T1}$ and $\varepsilon_{T4}$ corresponding to strains of the mounting surfaces to the press partial load calculator 12.

Figure 5:
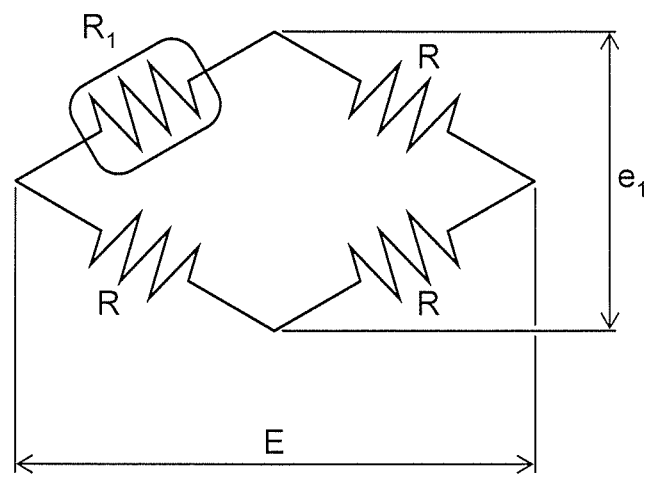
FIG. 5 illustrates a Wheatstone bridge circuit applied to the respective strain gauges.

The respective strain gauges 10-1 to 10-4 constitute the Wheatstone bridge circuit as illustrated in FIG. 5, and can detect the strain signals $\varepsilon_{T1}$ to $\varepsilon_{T4}$.

The Wheatstone bridge circuit shown in FIG. 5 is a circuit corresponding to the strain gauge 10-1, and includes a resistor $R_1$ of a strain gauge 10-1 for detecting a strain, and 3 fixed resistors R, and a constant voltage E is applied to the bridge. A voltage $e_1$ corresponding to the strain signal $\varepsilon_{T1}$ is output from the bridge in accordance with a resistance value $R_1$ (resistance value and the name of the resistor are both referred to as resistance $R_1$) that changes corresponding to the strain of the mounting surface of the strain gauge 10-1. Note that in the case where the strain is 0, the resistance value $R_1$ is equal to the resistance value R of the fixed resistor R, and the voltage $e_1$ is 0.

The remaining strain gauges 10-2 to 10-4 also constitute a similar Wheatstone bridge circuit to output the strain signals $\varepsilon_{T2}$ to $\varepsilon_{T4}$.

The slide inertial force signal G calculated by the inertial force calculator 11 is added to the press partial load calculator 12.

The inertial force calculator 11 calculates the slide inertial force signal G by using [Expression 5] based on the slide acceleration $\alpha$ detected by the acceleration detector 13.

The acceleration detector 13 differentiates the crank shaft angle signals from encoders (not illustrated) provided on the crank shaft 112L or 112R of the press machine 100 by time to generate a crank shaft angular velocity signal, converts the crank shaft angular velocity signal in to a slide speed signal in the vertical direction of the slide 110, and further differentiates the slide speed signal with respect to time to calculate a slide acceleration signal. Note that the slide acceleration signal may be calculated by twice—differentiating the slide position signal S from a slide position detector (not illustrated) for detecting the slide position with respect to time.

Although the mass M may be a preset value, when the upper mold 120 to be mounted on the slide 110 is replaced, it is preferable that the mass M is set by the mass of the upper mold that has been exchanged.

The press partial load calculator 12 calculates the press partial load signals $F_1'$ to $F_4'$ by using [Expression 1] to [Expression 4] based on the strain signals $\varepsilon_{T1}$ to $\varepsilon_{T4}$ input from the strain gauges 10-1 to 10-4. The press partial load signals $F_1'$ to $F_4'$ include a strain signals $\varepsilon_G$ (error) corresponding to the slide inertial force g, as expressed in [Expression 6] to [Expression 9].

Therefore, based on the slide inertial force signal G input from the inertial force calculator 11, the press partial load calculator 12 eliminates the impact (in this example, G/4) due to the slide inertial force by [Expression 22] to [Expression 25], and calculates the calibrated correct press partial load signals F1 to F4.

Figure 6:
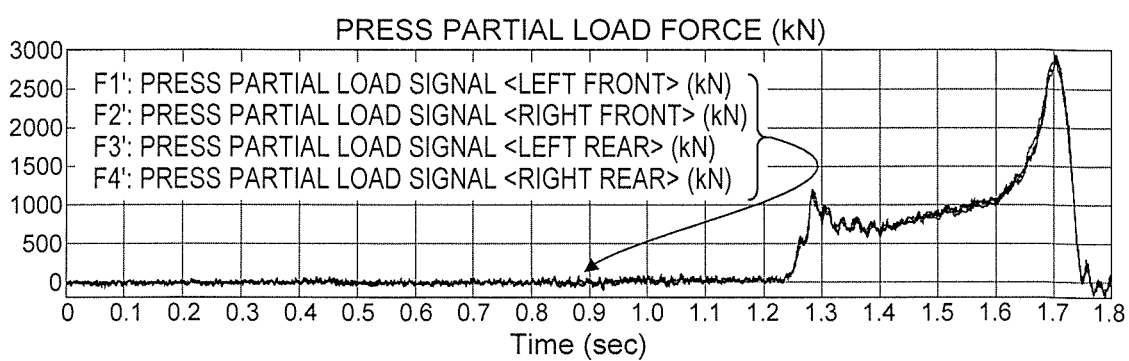
FIG. 6 is a waveform diagram showing the press partial load signals $F_1$ to $F_4$ calculated by a press partial load calculator.

FIG. 6 is a waveform diagram showing the press partial load signals $F_1$ to $F_4$ calculated by a press partial load calculator 12. Note that the four press partial load signals $F_1$ to $F_4$ shown in FIG. 6 are substantially superimposed on each other in such a manner that they cannot be clearly distinguished from each other in the drawings.

The press partial load signals $F_1'$ to $F_4'$, which is obtained by calibrating the impact of the slide inertial force shown in FIG. 6, shows substantially 0 in the no-load region where no press load is applied, compared with the press partial load signals $F_1'$ to $F_4'$ before the calibration which includes the impact of the slide inertial force shown in FIG. 2B.

Further, when the press load becomes maximum (cylinder strike) before the slide bottom dead center, the press partial load signal $F_1$ to $F_4$ after the calibration show correct press partial load values of about 100 kN, which is larger than the press partial load signals $F_1'$ to $F_4'$ before the calibration, in accordance with the slide deceleration.

The press partial load signals $F_1$ to $F_4$ after the calibration calculated by the press partial load calculator 12 are output respectively to the adder 20 and the output section 22.

The adder 20 adds the press partial load signals $F_1$ to $F_4$ to output the sum (total) of the press partial load signals to the output section 22 as the press load signal F.

Figure 7:
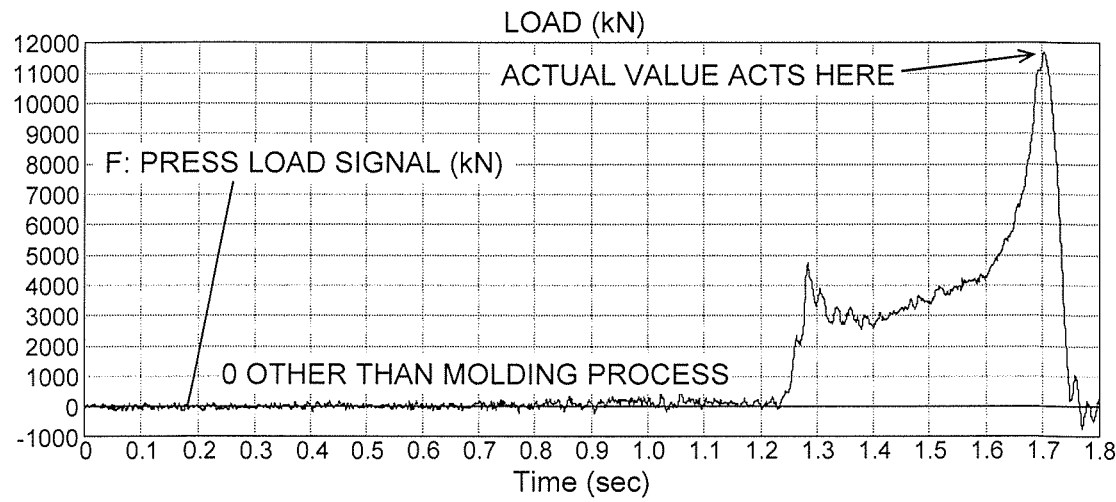
FIG. 7 is a waveform diagram showing a press load signal F of the sum of the press partial load signals $F_1$ to $F_4$.

FIG. 7 is a waveform diagram showing a press load signal F of the sum of the press partial load signals $F_1$ to $F_4$.

The press load signal F shown in FIG. 7 shows a load value approximately 4 times that of the respective press partial load signals $F_1$ to $F_4$ shown in FIG. 6.

Figure 11:
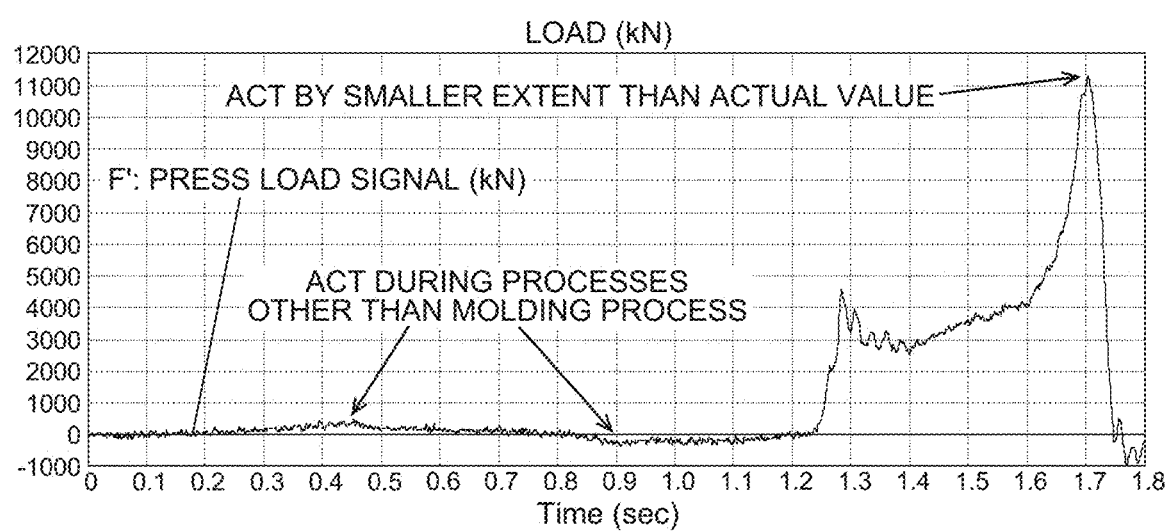
FIG. 11 is a waveform diagram of a press load signal F' showing a press load (kN) measured by a method of measuring a press load of the related art.

The press load signal F which is obtained by calibrating the impact of the slide inertial force shown in FIG. 7, shows the press load value of substantially 0 in the no-load region where no press load is applied, compared with the press load signal F' of the related art shown in FIG. 11.

Further, when the press load becomes maximum (cylinder strike) before the slide bottom dead center, the press load signal F after the calibration shows a correct press load value of about 400 kN, which is larger than the press load signal F of the related art, in accordance with the slide deceleration.

The output section 22 outputs the calibrated press load signal F, the press partial load signals $F_1$ to $F_4$ to a monitor device, a printer, a storage device, and the like, not illustrated, so that the correct press load signal F and the press partial load signals $F_1$ to $F_4$ are provided to the user.

A molding try, which is performed by using the servo press, is a severe one which is also referred to as a life line for the user. On the other hand, the press manufacturer sets the accuracy of detection of the press load value by the press load measuring apparatus provided on the press machine to approximately 10% of the capacity (the maximum press load) and recommends for the user to use the press load value only as a guide. There was a deviation between the two.

At the present when the servo press is becoming widespread, for example, as described above, the pursuit of the slide speed dependence on the molding properties by the user is a natural attitude and the press load signal, which is an important factor for evaluating the slide speed dependence, should not be neglected only for the convenience of the press manufacturer. Even if the absolute accuracy is about 10% of the capacity, as described above, by eliminating the slide inertial force associated with the slide acceleration from the press load signal, the relative accuracy of the press load signal per cycle is improved, and the confusion of the user, which has occurred when the slide speed setting is changed in the related art, can be eliminated.

In a large-sized press machine having a capacity as large as 250000 kN, a slide mass as large as 90000 kg including the upper mold mass, a large slide stroke, and the maximum slide speed higher than 1000 mm/sec. (exceeding 400 mm/second also in the molding region) as the press machine 100 (FIG. 1) of this example, the slide inertial force cannot be ignored as an "error" to be incorporated into the press load signal, and must be considered.

According to the invention, by eliminating the impact of the slide inertial force from the press load signal F' or the press partial load signals $F_1'$ to $F_4'$ including the impact of the slide inertial force, it is possible to provide the user with the correct press load signal F and the press partial load signals $F_1$ to $F_4$.

By providing such a correct press load signal or press partial load signals to the user, it is possible to support the user trying to inspect the relationship between the molding properties and the press load values or the press partial load values can be supported so that the press machine (dedicated) manufacturer's credit can be maintained.

[Press Load Measuring Apparatus of Press Machine of Second Embodiment]

Figure 8:
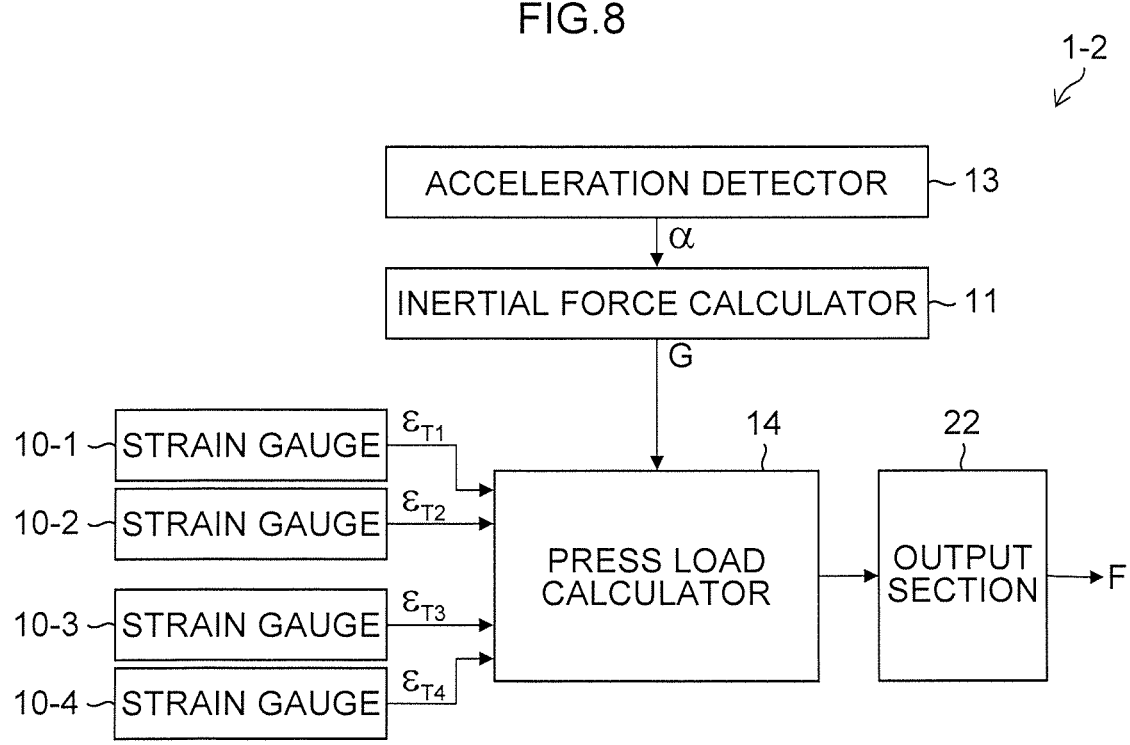
FIG. 8 is a block diagram illustrating a second embodiment of the press load measuring apparatus of a press machine.

FIG. 8 is a block diagram illustrating a second embodiment of the press load measuring apparatus of a press machine. Note that in FIG. 8, parts common to the press load measuring apparatus 1-1 of the press machine of the first embodiment illustrated in FIG. 4 are designated by the same reference numerals, and detailed description thereof will be omitted.

The press load measuring apparatus 1-2 of the press machine according to the second embodiment illustrated in FIG. 8 is different from the press load measuring apparatus 1-1 of the press machine of the first embodiment illustrated in FIG. 4 in that a press load calculator 14 is provided instead of the press partial load calculator 12 and the adder 20.

In FIG. 8, the press load calculator 14 receives the strain signal $\varepsilon_{T1}$ to $\varepsilon_{T4}$ from the strain gauges 10-1 to 10-4, and receives the slide inertial force signal G from the inertial force calculator 11.

The press load calculator 14 calculates a press load signal including the impact of the slide inertial force based on the strain signals $\varepsilon_{T1}$ to $\varepsilon_{T4}$ input from the strain gauges 10-1 to 10-4, eliminates the slide inertial force signal G from the calculated press load signal, and calculates the calibrated correct press load signal.

In other words, based on the strain signals $\varepsilon_{T1}$ to $\varepsilon_{T4}$, the press load calculator 14 calculates the press partial load signals F1' to F4' based on [Expression 1] to [Expression 4], and calculates the sum (total) of the press partial load signals F1' to F4' to calculate the press load signal F'. Then, the slide inertial force signal G is subtracted from the calculated press load signal F' to calculate the calibrated correct press load signal F.

The press load signal F calculated by the press load calculator 14 is output to the monitor device, the printer, the storage device and the like via the output section 22, and is provided to the user as a correct press load signal F.

In the press load measuring apparatus 1-2 of the press machine of the second embodiment, the calibrated press partial load signals $F_1$ to $F_4$ are not calculated as in the press load measuring apparatus 1-1 of the press machine of the first embodiment, but it is possible to calculate the calibrated correct press load signal F.

[Press Load Measuring Method of Press Machine of First Embodiment]

Figure 9:
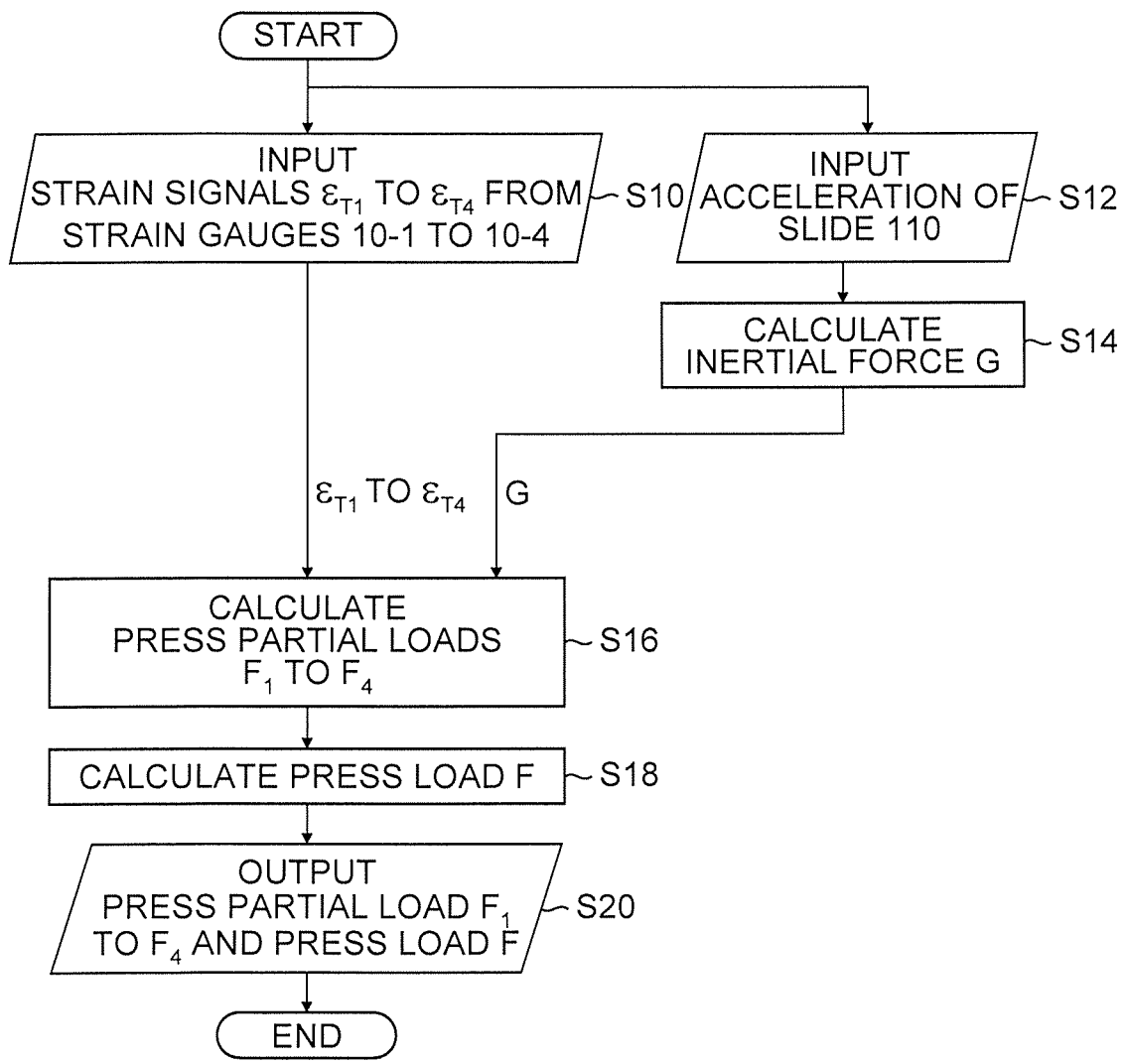
FIG. 9 is a flowchart illustrating a press load measuring method for the press machine according to the first embodiment.

FIG. 9 is a flowchart showing a press load measuring method for the press machine according to the first embodiment. Note that the press load measuring method of the press machine of the first embodiment is a method corresponding to the press load measuring apparatus 1-1 of the press machine of the first embodiment illustrated in FIG. 4.

In FIG. 9, the press partial load calculator 12-1 inputs the strain signals $\varepsilon_{T1}$ and $\varepsilon_{T4}$ from the strain gauges 10-1 to 10-4 attached to the four columns 104-1 to 104-4 (step S10).

At the same time, the inertial force calculator 11 inputs the slide acceleration α from the acceleration detector 13 (Step S12).

The inertial force calculator 11 calculates the slide inertial force signal G based on the slide 110, the mass M of the upper mold 120 associated with the slide 110, and the input the slide acceleration α using [Expression 5] (Step S14).

Based on the strain signals $\varepsilon_{T1}$ to $\varepsilon_{T4}$ input from the strain gauges 10-1 to 10-4 and the slide inertial force signal G input from the inertial force calculator 11, the press partial load calculator 12 calculates the correct press partial load signals $F_1$ to $F_4$ from which the error caused by the slide inertial force is eliminated by using [Expression 18] to [Expression 21] (Step S16).

The adder 20 adds the press partial load signals $F_1$ to $F_4$ to calculate the sum (total) of the press partial load signals as the press load signal F (Step S18).

The output section 22 outputs the press partial load signals $F_1$ to $F_4$ and the press load signal F calculated in Steps S16 and S18 to the monitor device, the printer, the storage device, and the like, so that the correct press partial load signals can be provided to the user (Step S20).

The series of processes from step S10 to step S20 are performed at a high speed, whereby the press load signal F and the press partial load signals $F_1$ to $F_4$, which change momentarily, can be acquired.

[Press Load Measuring Method of Press Machine of Second Embodiment]

Figure 10:
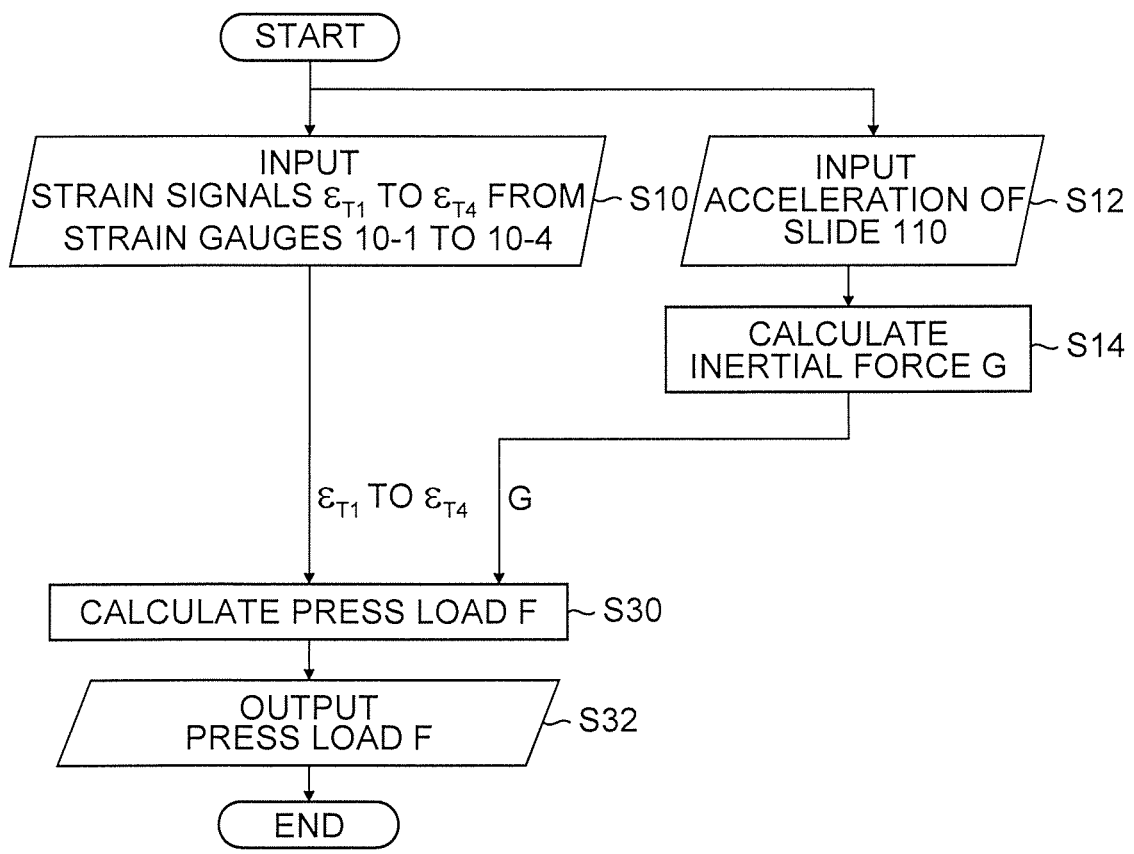
FIG. 10 is a flowchart showing a press load measuring method for the press machine according to the second embodiment.

FIG. 10 is a flowchart showing a press load measuring method for the press machine according to the second embodiment.

The press load measuring method of the press machine of the second embodiment is a method corresponding to the press load measuring apparatus 1-2 of the press machine of the second embodiment illustrated in FIG. 8. Note that in FIG. 10, parts common to those in the first embodiment shown in FIG. 9 are designated by the same step numbers, and detailed description thereof will be omitted.

The second embodiment illustrated in FIG. 10 is different from the first embodiment illustrated in FIG. 9 in that the processing in Steps S30 and S32 are performed instead of Steps S16, S18, and S20.

In FIG. 10, the press load calculator 14 calculates a press load signal including the impact of the slide inertial force based on the strain signals $\varepsilon_{T1}$ to $\varepsilon_{T4}$ input from the strain gauges 10-1 to 10-4 and the slide inertial force signal G input from the inertial force calculator 11, eliminates the slide inertial force signal G from the calculated press load signal, and calculates the calibrated correct press load signal F (Step S30).

In other words, based on the strain signals $\varepsilon_{T1}$ to $\varepsilon_{T4}$, the press load calculator 14 calculates the press partial load signals F1' to F4' based on [Expression 1] to [Expression 4], and calculates the sum (total) of the press partial load signals F1' to F4' to calculate the press load signal F'. Then, the slide inertial force signal G is subtracted from the calibrated press load signal F' to calculate the calibrated correct press load signal F.

The output section 22 outputs the press load signal F calculated in Step S18 to the monitor device, the printer, the storage device, and the like, so that the correct press partial load signals can be provided to the user (Step S32).

[Others]

Although the press machine to which the present embodiment is applied is a crank press of a 2-point type, the invention is not limited to the crank press of the 2 point type, but can be applied to the press machine of a screw type or a hydraulic type, and also to a 1-pair toggle mechanism type, or the like in which a slide is pushed in a vertical direction.

Although the press machine to which this embodiment is applied includes four columns front, rear, left and right columns, the invention is applicable to press machines having a plurality of, that is, two or more columns, in which case the strain gauges also need to be attached to the respective columns of the plurality of columns.

Further, the invention is not limited to the embodiments described above, and it goes without saying that various modified examples can be made without departing from the spirit of the invention.

What is claimed is:

1. A press load measuring apparatus for a press machine, in which a slide is driven by a crank mechanism, comprising:
    a plurality of strain gauges attached to a plurality of columns of the press machine respectively, the plurality of strain gauges configured to detect respective strains generated in the plurality of columns in association with a press load acting on the slide of the press machine;
    an acceleration detector configured to detect the acceleration of the slide;
    an inertial force calculator configured to calculate a slide inertial force G by using the following expression $G=-M\cdot\alpha$, where M is a mass of the slide and a member connected to the slide that is a preset mass and $\alpha$ is the acceleration of the slide in an upward direction to be detected by the acceleration door; and
    a press load calculator configured to calculate press loads before calibration based on strains detected by the strain gauges attached to the respective columns of the plurality of columns, eliminate the calculated slide inertial force from the press loads before the calibration, and calculate calibrated press loads.

2. The press load measuring apparatus for a press machine according to claim 1, further comprising an output section configured to output the calibrated press loads.

3. The press load measuring apparatus for a press machine according to claim 1, wherein the member connected to the slide includes an upper mold attached to the slide.

4. A press load measuring method for a press machine, in which a slide is driven by a crank mechanism, comprising:
    attaching strain gauges respectively to a plurality of columns of the press machine, the strain gauges detecting strains generated in the respective columns in association with a press load acting on the slide of the press machine;
    detecting, by an acceleration detector, an acceleration of the slide;
    calculating a slide inertial force G, by an inertial force calculator, by using the following expression $G=-M\cdot\alpha$, where M is a mass of the slide and a member connected to the slide that is a preset mass and $\alpha$ is the acceleration of the slide in an upward direction to be detected by the acceleration detector;
    calculating press partial loads before calibration based on strains detected by the strain gauges attached to the respective columns of the plurality of columns;
    eliminating the calculated slide inertial force from the press loads before the calibration; and
    calculating calibrated press loads by a press load calculator.

* * * * *